US00RE44409E

(19) United States
(12) Reissued Patent
Dando et al.

(10) Patent Number: US RE44,409 E
(45) Date of Reissued Patent: *Aug. 6, 2013

(54) METHOD FOR ELECTRONIC TRACKING OF UNITS ASSOCIATED WITH A BATCH

(75) Inventors: Ross S. Dando, Nampa, ID (US); Mark E. Tuttle, Zhubei (TW)

(73) Assignee: Round Rock Research, LLC, Jersey City, NJ (US)

( * ) Notice: This patent is subject to a terminal disclaimer.

(21) Appl. No.: 13/269,853

(22) Filed: Oct. 10, 2011

Related U.S. Patent Documents

Reissue of:

(64) Patent No.: 6,545,604
Issued: Apr. 8, 2003
Appl. No.: 09/346,635
Filed: Jul. 1, 1999

U.S. Applications:

(63) Continuation of application No. 11/872,374, filed on Oct. 15, 2007, now Pat. No. Re. 42,821, which is a continuation of application No. 11/102,887, filed on Apr. 8, 2005, now Pat. No. Re. 41,562, which is a continuation of application No. 09/346,635, filed on Jul. 1, 1999, now Pat. No. 6,545,604.

(51) Int. Cl.
*G08B 13/14* (2006.01)

(52) U.S. Cl.
USPC ..... 340/572.1; 340/572.9

(58) Field of Classification Search
USPC .. 340/572.1, 572.9, 825.15, 825.35; 452/198, 452/148
See application file for complete search history.

(56) References Cited

U.S. PATENT DOCUMENTS

| | | | |
|---|---|---|---|
| 4,847,592 | A | 7/1989 | Hogen Esch et al. |
| 5,053,774 | A | 10/1991 | Schuermann et al. |
| 5,266,925 | A | 11/1993 | Vercellotti et al. |
| 5,365,551 | A | 11/1994 | Snodgrass et al. |
| 5,367,289 | A | 11/1994 | Baro et al. |
| 5,497,140 | A | 3/1996 | Tuttle |
| 5,565,858 | A | 10/1996 | Guthrie |
| 5,886,634 | A | 3/1999 | Muhme |
| 5,910,776 | A | 6/1999 | Black |

(Continued)

OTHER PUBLICATIONS

Dando, Ross, U.S. Appl. No, 11/872,374; "Methods for Electronic Tracking of Units Originating From a Common Source, and Assemblies Comprising Transponders Attached to Meat Spikes", filed Oct. 15, 2007.

(Continued)

*Primary Examiner* — John A Tweel, Jr.
(74) *Attorney, Agent, or Firm* — Gazdzinski & Associates, PC

(57) ABSTRACT

[In one aspect, the invention encompasses a method for electronic tracking of units originating from a common source which comprises a plurality of units physically joined with one another. A first transponder is physically associated with the common source, and the source is split to separate it into three or more of the units. A second transponder is physically associated with one of the three or more units, and the second transponder sends a code. The code of the second transponder is electrically associated with an identifier of the common source. In a particular aspect, the common source is an animal carcass.] *A batch comprises separate units of objects that are physically joined together. RFID tags are attached to each of the units and to the batch. The codes stored in the RFID tags are electrically associated with one another in the database.*

32 Claims, 6 Drawing Sheets

U.S. PATENT DOCUMENTS

| | | | | |
|---|---|---|---|---|
| 5,945,909 | A | 8/1999 | Kolton | |
| 5,963,134 | A | 10/1999 | Bowers | |
| 6,000,361 | A | 12/1999 | Pratt | |
| 6,010,239 | A | 1/2000 | Hardgrave et al. | |
| 6,045,652 | A | 4/2000 | Tuttle | |
| 6,060,992 | A | 5/2000 | Huang et al. | |
| 6,100,804 | A | 8/2000 | Brady et al. | |
| 6,130,602 | A | 10/2000 | O'Toole et al. | |
| 6,166,637 | A | 12/2000 | Cyr et al. | |
| 6,204,764 | B1 | 3/2001 | Maloney | |
| 6,229,445 | B1 | 5/2001 | Wack | |
| 6,496,806 | B1 | 12/2002 | Horwitz et al. | |
| 6,545,604 | B1 | 4/2003 | Dando et al. | |
| 6,669,089 | B2 | 12/2003 | Cybulski et al. | |
| RE42,736 | E * | 9/2011 | Dando et al. | 340/572.1 |
| RE42,821 | E * | 10/2011 | Dando et al. | 340/572.1 |

OTHER PUBLICATIONS

Dando, Ross, U.S. Appl. No. 11/872,382; "Methods for Electronic Tracking of Units Originating From a Common Source, and Assemblies Comprising Transponders Attached to Meat Spikes", filed Oct. 15, 2007.

Dando, Ross, U.S. Appl. No. 11/872,390; "Methods for Electronic Tracking of Units Originating From a Common Source, and Assemblies Comprising Transponders Attached to Meat Spikes", filed Oct. 15, 2007.

Dando, Ross, U.S. Appl. No. 11/872,397; "Methods for Electronic Tracking of Units Originating From a Common Source, and Assemblies Comprising Transponders Attached to Meat Spikes", filed Oct. 15, 2007.

USPTO Transaction History of U.S. Appl. No. 09/346,635, filed Jul. 1, 1999, entitled "Methods For Electronic Tracking Of Units Originating From A Common Source, And Assemblies Comprising Transponders Attached To Meat Spikes," now U.S. Patent No. 6,545,604.

USPTO Transaction History of U.S. Appl. No. 11/872,374, filed Oct. 15, 2007, entitled "Methods For Electronic Tracking Of Units Originating From A Common Source, And Assemblies Comprising Transponders Attached To Meat Spikes."

USPTO Transaction History of U.S. Appl. No. 11/872,382, filed Oct. 15, 2007, entitled "Methods For Electronic Tracking Of Units Originating From A Common Source, And Assemblies Comprising Transponders Attached To Meat Spikes."

USPTO Transaction History of U.S. Appl. No. 11/872,390, filed Oct. 15, 2007, entitled "Methods For Electronic Tracking Of Units Originating From A Common Source, And Assemblies Comprising Transponders Attached To Meat Spikes."

USPTO Transaction History of U.S. Appl. No. 11/872,397, filed Oct. 15, 2007, entitled "Methods For Electronic Tracking Of Units Originating From A Common Source, And Assemblies Comprising Transponders Attached to Meat Spikes."

IEEE Radio Frequency Intergrated Circuits Symposium, 1997.

* cited by examiner

METHOD FOR ELECTRONIC TRACKING OF UNITS ASSOCIATED WITH A BATCH

Matter enclosed in heavy brackets [ ] appears in the original patent but forms no part of this reissue specification; matter printed in italics indicates the additions made by reissue.

*RELATED REISSUE APPLICATIONS*

*More than one reissue application has been filed for the reissue of U.S. Pat. No. 6,545,604. The reissue applications are the initial reissue application Ser. No. 11/102,887 filed Apr. 8, 2005 which issued on Aug. 24, 2010 as U.S. Reissue Pat. No. RE 41,562; a continuation reissue application Ser. No. 11/872,374 filed Oct. 15, 2007 which issued on Oct. 11, 2011 as U.S. Reissue Pat. No. RE 42,821; a continuation reissue application Ser. No. 11/872,382 filed Oct. 15, 2007 which issued on Oct. 12, 2010 as U.S. Reissue Pat. No. RE 41,815; a continuation reissue application Ser. No. 11/872,390 filed Oct. 15, 2007 which issued on Sep. 27, 2011 as U.S. Reissue Pat. No. RE 42,736; a continuation reissue application Ser. No. 11/872,397 filed Oct. 15, 2007, now abandoned, and the present reissue application.*

*CROSS REFERENCE TO RELATED APPLICATIONS*

*This is a continuation of U.S. Reissue application Ser. No. 11/872,374, filed Oct. 15, 2007, which issued on Oct. 11, 2011 as U.S. Reissue Pat. No. RE 42,821 which is a continuation of U.S. Reissue patent application Ser. No. 11/102,887, filed Apr. 8, 2005, which issued on Aug. 24, 2010 as U.S. Reissue Pat. No. 41,562; which is a reissue application of U.S. patent application Ser. No. 09/346,635, filed Jul. 1, 1999, now U.S. Pat. No. 6,545,604, each of which is incorporated by reference.*

TECHNICAL FIELD

The invention pertains to methods of electronic tracking of units originating from a common source, such as, for example, methods for electronic identification of meat units originating from a common animal carcass. The invention further pertains to particular transponder assemblies, such as transponders attached to meat spikes.

BACKGROUND OF THE INVENTION

Radio frequency identification devices (RFID's) are commonly utilized for electronically identifying objects. In an exemplary application, a transponder is attached to an object which is to be identified. The transponder can be incorporated into a passive, read-only RFID system which comprises an interrogator used in conjunction with the transponder. The interrogator provides a carrier signal which powers (stimulates) the transponder and causes a signal to be transmitted from the transponder. The signal comprises data which identifies the object associated with the transponder. The signal is received by the interrogator, which is in data communication with a processing system configured to decode and interpret the data.

The interrogator commonly uses a coil antenna to stimulate the transponder. The transponder will frequently comprise a parallel resonant LC circuit, with such circuit being resonant at a carrier frequency of the interrogator.

An exemplary application of a passive, read-only RFID system is for identification of individual animals in a meat-processing plant. A reason for identifying individual animals in a meat-processing plant is to improve meat quality and/or farming processes. For instance, in modern farming practices it is desirable to track an animal throughout its entire lifetime up to, and including, slaughter to aid in understanding the factors that influence meat quality. To accomplish such tracking, an RFID transponder tag can be placed in an animal's ear at time of birth, and utilized to document events occurring within the animal's life. For instance, the RFID transponder can be utilized with interrogators to catalog the feed ingested by the animal, vaccinations provided to the animal, and any growth hormones administered to the animal. The transponder can further be utilized in combination with an interrogator at time of slaughter to catalogue the meat quality of the animal. Transponders can be utilized to track many (or even all) of the individual animals of a population, and information accumulated by the transponders can be studied to relate the effect, if any, of particular farming practices on meat quality.

In an exemplary use of a RFID in a meat-processing plant, transponders are provided on individual animal bodies within the plant to enable tracking of the bodies during processing to enable, for example, meat products from a particular body to be pulled in the event the body is found to be contaminated or diseased.

An exemplary system for utilizing passive, read-only RFID for identification and tracking of individual animals in a meat-processing plant is described with reference to FIG. 1, which illustrates a carcass-transporting device (conveyer) 20, and an interrogator 32 (shown as a computer).

Carcass-transporting device 20 includes a trolley 22 having a hook 24 connected thereto. A track 28 is provided along which trolley 22 can be moved from processing station to processing station within the meat-processing plant. An animal body (carcass) 26 is shown connected with hook 24.

An RFID device is shown generally at 30 as being mounted directly on trolley 22. Device 30 includes a transponder which enables wireless communication to be conducted between device 30 and interrogator 32. Specifically, interrogator 32 can include suitable transmit and receive circuitry to both transmit signals to device 30, and receive signals transmitted from device 30. The wireless communication between interrogator 32 and device 30 can take place through, for example, RF transmissions. A suitable device for conducting RF communication between an interrogator and a transponder is disclosed in pending U.S. patent application Ser. No. 08/705,043, the disclosure of which is expressly incorporated herein by reference. Of course, other transponders and interrogators can be used.

The stage of meat processing shown in FIG. 1 can be a relatively early step in a meat processing sequence. Specifically, carcass 26 corresponds to an animal body which has been skinned and gutted, and in the case of large animal (such as a cow) may correspond to a half of the resulting carcass (with such carcass having been split longitudinally to form the half). For purposes of the remaining discussion, it will be assumed that carcass 26 corresponds to half of a beef body. Of course, in such instances there is another half of the beef body at some other location of the slaughterhouse. Such other half of the beef body can have a separate transponder (analogous to transponder unit 30) associated therewith, and the coded signals from the transponders associated with each half of the beef body can be correlated together in a database such that it is recognized that both halves came from the same beef body. Accordingly, if a defect (or disease) is evidenced by either half of the animal body from which carcass 26 originated, the other half of such animal body can be readily tracked within the slaughterhouse and identified.

An identifier of the live animal from which carcass 26 was obtained can also be provided on the database, and the coded signals of the transponders can be electrically associated with such identifier to link the coded signals of the transponders with the identifier in a program such as, for example, a spreadsheet program. Accordingly, information learned about conformation or meat quality during processing of the animal body can be related with other information obtained during the rearing of the live animal and displayed utilizing the program.

A typical slaughterhouse scenario for carcass 26 is as follows. The carcass is passed across a scale to determine a "hot weight" of the carcass. For cattle, such hot weight is determined after the full carcass has been halved into slabs. After the hot weight is determined, the carcass is placed in a first chiller, where it stays for 24 hours. The carcass is then transferred to a second chiller, where it stays for another 24 hours. The meat is passed through two chillers sequentially because such is a convenient way of processing and tracking large quantities of meat. In slaughterhouses wherein a small quantity of meat is processed, the meat may stay in a single chiller for the entire cooling period.

After the carcass has been chilled for a total of 48 hours (24 hours in the first chiller followed by 24 hours in the second chiller), the carcass is weighed to determine a so-called "cold weight" of the carcass and the meat of the carcass is graded by a meat inspector. A comparison of the cold weight to the hot weight can indicate an amount of meat shrinkage, and can be useful in determining a quality of the meat. After a plurality of carcasses are graded, they are divided by grade and sent to fabrication. At fabrication, the carcasses are subdivided into smaller units and packaged for distribution.

FIG. 2 illustrates an initial step of a fabrication process. Specifically, carcass 26 (which is, for purposes of the following discussion, a slab corresponding to half of an animal body) is split to form two units corresponding to a front quarter 36 (also referred to as a shank) and a hind quarter 38. It is noted in referring to FIG. 2 that a meat spike 40 has been inserted into slab 26 and has a tag 42 extending there from. Such spike can be inserted by inspectors and other persons associated with meat processing to attach information such as, for example, identification or USDA information to slab 26.

After slab 26 is split into units 36 and 38, a separate spike can be inserted into unit 36 to provide additional identifying information associated with unit 36.

Units 36 and 38 are conveyed to areas of the slaughterhouse wherein such units are subdivided into portions suitable for distribution, and then packaged. A common package will be a box containing particular cuts of meat, such as, for example, steaks or roasts. A single box will generally contain cuts of meat from several animal carcasses.

A difficulty of present meat processing methodologies is in tracking the meat through a slaughterhouse. Specifically, it can be desirable to track meat entirely from the time an animal enters a slaughterhouse until the animal is packaged, and to thereby have a record of exactly which packages the meat from the animal was distributed in. Then, if a problem is discovered with any of the meat from the animal, it can be a simple matter to recall all of the packages that contain other meat from the animal. For instance, if bacterial contamination of a meat product is discovered, it is desirable recall all meat originating from the same carcass as the contaminated meat product.

As another example of the desirability of tracking an animal carcass from the time it enters a slaughterhouse until the time it is packaged for distribution is a scenario wherein a meat product is found to have exceptional qualities. In such circumstances, it can be desirable to track the meat product back to the originating animal and the farming practices which developed such particular high quality product.

SUMMARY OF THE INVENTION

[In one aspect, the invention encompasses a method for electronic tracking of units originating from a common source. The common source comprises a plurality of units physically joined with one another. A first transponder is physically associated with the common source, and the source is split to separate it into three or more of the units. A second transponder is physically associated with one of the three or more units, and the second transponder sends a code. The code of the second transponder is electrically associated with an identifier of the common source.]

[In another aspect, the invention encompasses a method for electronic identification of meat units originating from a common animal carcass. An animal carcass is provided on a conveyor and conveyed through a meat processing plant. The animal carcass initially has a first transponder physically associated therewith, and the first transponder sends a code which is electrically associated with an identifier of the animal carcass. The animal carcass is split into at least two first units, and one or more of the first units is physically separated from the first transponder after such splitting. One or more second transponders are physically associated with at least one of the first units that were physically separated from the first transponder by the first splitting. The second transponders send codes. The codes of the second transponders are electrically associated with the identifier of the animal carcass.]

[In yet another aspect, the invention encompasses an assembly comprising a transponder attached to a meat spike.]

*In a first aspect, a method for remotely sensing articles is disclosed. In one embodiment, the method comprises providing a source with at least one unit associated therewith, the source and at least one unit having a common identification; providing a first radio frequency identification (RFID) device associated with the source comprising a substrate, one or more antennas disposed adjacent the substrate, a radio frequency transceiver integrated circuit disposed adjacent the substrate comprising a radio frequency receiver for receiving radio frequency signals, a radio frequency transmitter for communicating radio frequency signals, control logic, a memory for persistently storing data including the common identification indicating the source, the radio frequency transceiver integrated circuit coupled to the one or more antennas, and a power source coupled to the radio frequency transceiver integrated circuit; using a remote radio frequency interrogator, transmitting a radio frequency signal including a command interrogating the first RFID device to determine the common identification; receiving in response, a radio frequency signal communication from the first RFID device including the common identification; affixing to at least one unit physically associated with the source a second RFID device comprising a substrate, a radio frequency transceiver integrated circuit disposed adjacent the substrate comprising a radio frequency receiver, a radio frequency transmitter, control logic, a memory for persistently storing data, the radio frequency transceiver integrated circuit coupled to the one or more antennas, and a power source coupled to the radio frequency transceiver; transmitting to the second RFID*

*device, from a radio frequency interrogator in remote proximity to the selected article a radio frequency signal including a second identification and a command to store the second identification in the memory within the second RFID device; storing the second identification in the memory of the second RFID device; and associating the common identification and the second identification in a database.*

*In a second aspect of the invention, a method is disclosed. In one embodiment the method comprises providing a source and at least one unit from the source having a common identification, wherein the unit is packaged with the source; providing, on the source, a first radio frequency identification (RFID) device associated with the group of articles comprising a substrate, one or more antennas disposed adjacent the substrate, a radio frequency transceiver integrated circuit disposed adjacent the substrate comprising a radio frequency receiver for receiving radio frequency signals, a radio frequency transmitter for communicating radio frequency signals, control logic, a memory for persistently storing data including the common identification indicating the group, the radio frequency transceiver integrated circuit coupled to the one or more antennas, and a power source coupled to the radio frequency transceiver integrated circuit; transmitting to the first RFID device, from a radio frequency interrogator in remote proximity to the group of article, a radio frequency signal including a command interrogating the first RFID device to determine the common identification; receiving in response, a radio frequency signal communication from the first RFID device including the common identification; affixing to a selected unit from the source a second RFID device comprising a substrate, a radio frequency transceiver integrated circuit disposed adjacent the substrate comprising a radio frequency, a radio frequency transmitter, control logic, a memory for storing data including a second identification, the radio frequency transceiver integrated circuited coupled to the one or more antennas, and a power source coupled to the radio frequency transceiver; transmitting to the second RFID device, from a radio frequency interrogator in remote proximity to the selected article, a radio frequency signal including a command interrogating the second RFID device to determine the second identification; receiving in response, a radio frequency signal communication from the second RFID device including the second identification; associating the common identification and the second identification in a database; associating the common identification of the source and the second identification of the unit, with information about the source and the unit in the database.*

*In an alternative embodiment, the method comprises receiving a source for at least one unit having a common identification, the source and unit are packaged together, wherein a first radio frequency identification (RFID) device is affixed to the source and is associated with the at least one unit, and at least a second RFID device is affixed to the at least one unit, wherein at least the first and second RFID device comprise a substrate, one or more antennas disposed adjacent the substrate, a radio frequency transceiver integrated circuit disposed adjacent the substrate comprising a radio frequency receiver for receiving radio frequency signals, a radio frequency transmitter for communicating radio frequency signals, control logic, a memory for storing identification data, the radio frequency transceiver integrated circuit coupled to the one or more antennas, and a power source coupled to the radio frequency transceiver integrated circuit; transmitting to the first RFID device from a radio frequency interrogator in remote proximity to the source and at least one unit, a radio frequency signal including a command interrogating the first RFID device to determine the common identification; receiving in response, a radio frequency signal communication from the first RFID device including the common identification; accessing a database wherein the common identification is associated with at least the second identification in the database; transmitting to at least the second RFID device affixed to the at least one unit from the source, from a radio frequency interrogator in remote proximity to the selected article, a radio frequency signal including a command interrogating the second RFID device to determine the second identification; receiving in response, a radio frequency signal communication from the second RFID device including the second identification; accessing the database wherein at least the second identification of the at least one unit from the source is associated with information about the source; and separating the at least one unit from the source and redistributing the at least one unit.*

BRIEF DESCRIPTION OF THE DRAWINGS

Preferred embodiments of the invention are described below with reference to the following accompanying drawings.

FIG. 4 is a view of a carcass shown at a processing step similar to that of FIG. 2, wherein the processing step is conducted in accordance with a method of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
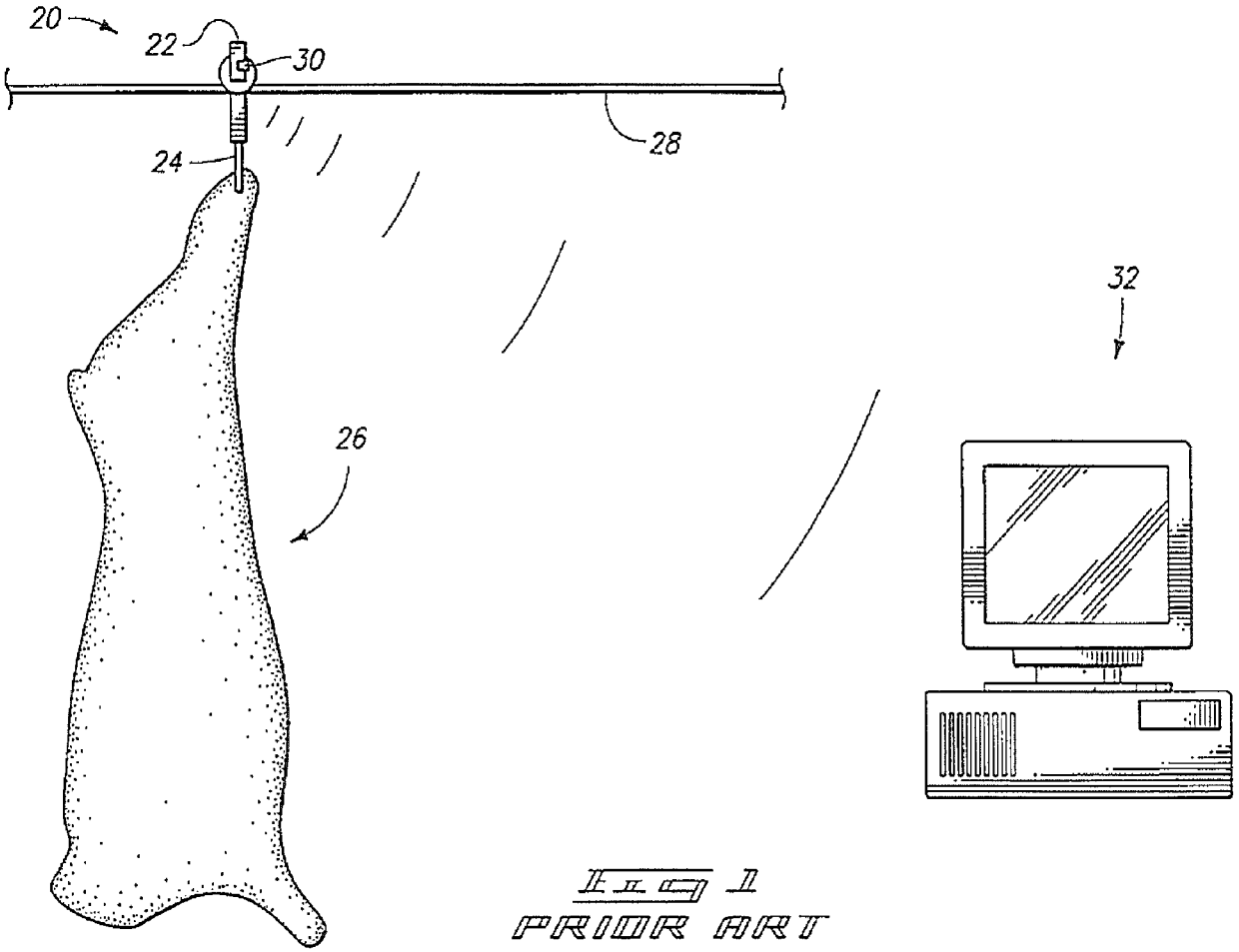
FIG 1 PRIOR ART
FIG. 1 shows a prior art carcass-transporting device, and shows a carcass at a preliminary stage of prior art meat processing.
Figure 2:
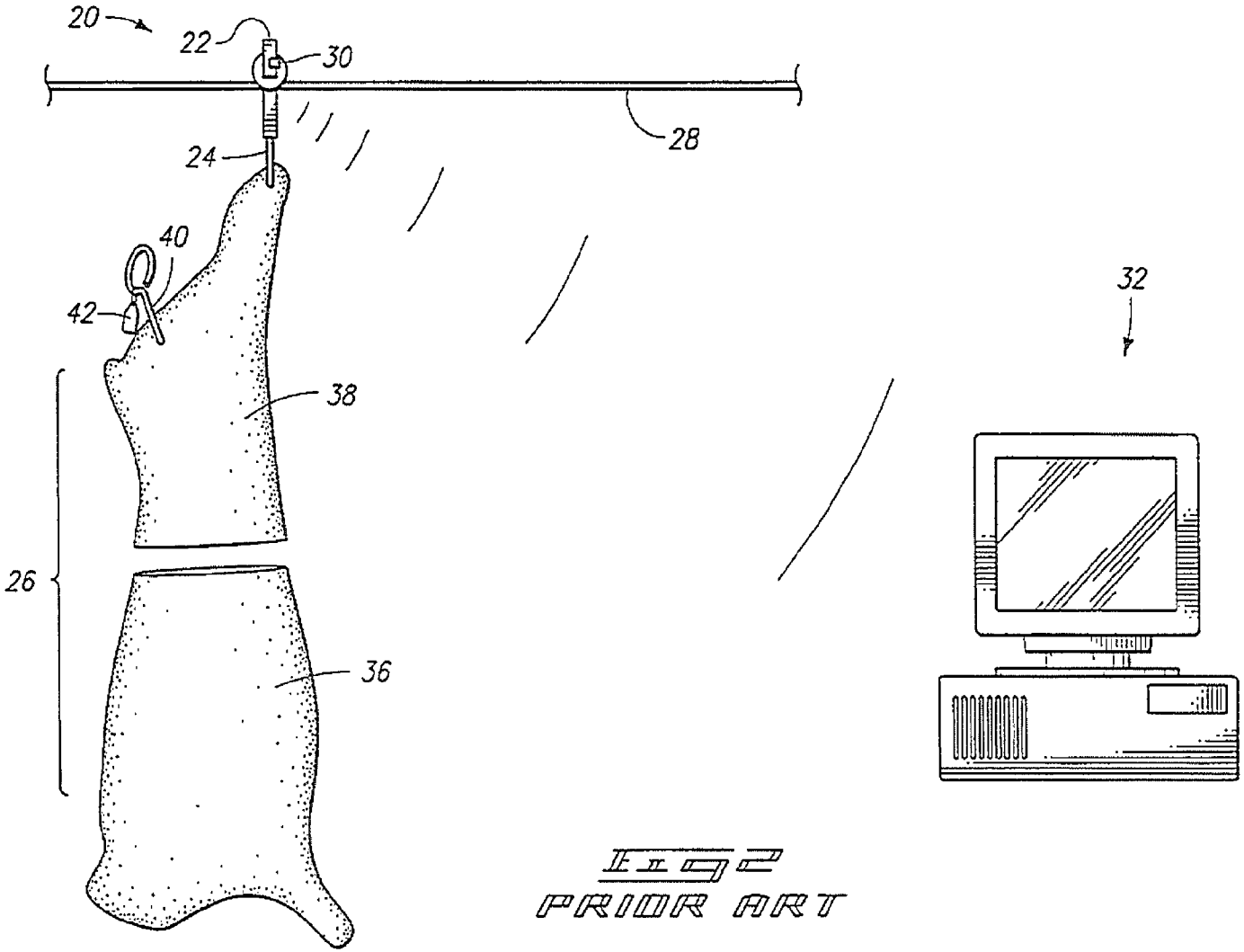
FIG 2 PRIOR ART
FIG. 2 shows the carcass of FIG. 1 at a prior art meat-processing stage subsequent to that of FIG. 1.

In one aspect, the invention is a recognition that a problem which occurs during the above-discussed processing of FIG. 2 is that after the animal carcass 26 is split into two parts, one of the two parts (specifically, unit 36) is no longer associated with transponder 30, and accordingly, is no longer electronically tracked. Accordingly, the invention encompasses methodologies for maintaining the electronic tracking of meat units after such units are split from a carcass.

One method of tracking meat units after they are split from a carcass is to physically associate one or more transponder units with such units during meat processing. Such method can be accomplished utilizing a meat spike and transponder assembly, such as the assembly 100 shown in FIG. 3. Assembly 100 comprises a meat spike 102 and a transponder device 104 joined to such meat spike. Transponder device 104 comprises circuitry (not shown) attached to a substrate. The substrate can comprise, for example, metal or plastic. In the shown embodiment, the substrate is provided in a circular shape and has an orifice 106 extending through about a center of the circular shape. The transponder circuitry of device 104 preferably defines a transponder comprising a radio frequency identification device, and more preferably defines a transponder comprising a passive, read-only RFID.

Meat spike 102 comprises a rod having a pair of opposing ends 110 and 112. End 110 is pointed, and end 112 comprises a holder in the shape of a loop. The substrate of transponder device 104 is slid over spike 102 and retained from sliding over end 112 by the loop of end 112.

The loop of meat spike 102 can enable prior art tags (such as, for example, tag 42 of FIG. 2) to be utilized with assembly 100. The invention, of course, contemplates other embodiments of assembly 100 wherein spike 102 comprises other configurations configured to retain transponder device 104. Such other configurations can include, for example, configurations lacking the loop of end 112 and instead having transponder device 104 glued, welded or otherwise adhered to spike 102. Further, the invention encompasses embodiments wherein transponder device 104 is retained in a manner similar to that by which prior art tags (such as tag 42) are retained by the looped end of a meat spike. Specifically, device 104 can be retained by a wire or string wrapped within the loop of end 112.

A method of the present invention is described with reference to FIG. 4. FIG. 4 shows a slab 26 at a processing step comparable to that described above with reference to prior art FIG. 2, and in referring to FIG. 4 similar numbering will be utilized as was utilized above in describing FIG. 2. The slab 26 of FIG. 4 has been split into two units (36 and 38) and unit 36 is physically separated from hanger 24 such that it is no longer tracked by transponder 30. However, a second transponder 120 is physically associated with unit 36 utilizing a meat spike assembly 130 of the type described with reference to FIG. 3. Specifically, meat spike assembly 130 comprises a meat spike 122 similar to the meat spike 102 of FIG. 3, and a transponder device 120 similar to device 104 of FIG. 3.

Transponder device 120 sends a code to interrogator 32. Preferably, interrogator 32 is in electrical communication with a database, and preferably the code from transponder 120 is electrically associated with both the code from transponder 30 and an identifier of slab 26 in the database. In a particular embodiment of the invention, a plurality of transponder assemblies 130 can be provided at a location in a meat processing plant wherein slabs are split into hind quarters and front quarters. A person could then retrieve one of the assemblies 130 from the plurality and interrogate the transponder device 120 with a interrogator device to register a code of the transponder device 120 within the interrogator. Preferably, the interrogator device would also be configured to ascertain a code from the transponder 30 previously associated with slab 26 and to link the transponder codes with one another in a database.

After the transponder codes are linked with one another in the database, a user can input a code from either transponder device 30 or transponder device 120 and ascertain the codes of other transponder devices which had been utilized to mark a portion of the animal body corresponding to slab 26. In preferred embodiments, an identifier of the live animal from which slab 26 was obtained will also be in the database, and the user will thus be able to utilize the code of either transponder device 30 or 120 to ascertain an identification of the animal from which slab 26 was obtained.

FIG. 4 shows that both of transponder devices 30 and 120 are simultaneously sending a signal to interrogator 32. In practice, such would generally not be the case. Rather, transponder device 30 and transponder device 120 would be sequentially interrogated by device 32.

Transponder assembly 130 can be inserted into unit 36 either before, during, or after the splitting of unit 36 from slab 26. It is noted, however, that second transponder assembly 130 will generally be added after slab 26 has been hanging from hook 24, and therefore after slab 26 is physically associated with transponder unit 30. Accordingly, first transponder device 30 will be associated with slab 26 for a period of time during which second transponder assembly 130 is not physically associated with slab 26.

Although in the shown embodiment first transponder assembly 30 is shown associated with a trolley from which slab 26 is hung, it is to be understood that the invention encompasses other embodiments (not shown) wherein first transponder device 30 is physically associated with slab 26 through other methodologies. For instance, first transponder device 30 could be associated with a meat hook in an assembly analogous to that of assembly 130 and associated with slab 26 by inserting the meat hook into slab 26. In such embodiments, the first transponder device assembly could be inserted into either the hind quarter portion of slab 26 or the front quarter portion of slab 26 (the portion which becomes unit 36).

Although in the shown embodiment slab 26 is divided into two portions, it is to be understood that slab 26 could be divided into more than two portions. Preferably, regardless of the number of portions that slab 26 is divided into, transponder devices are provided to be physically associated with each of the portions, and all of the transponder devices have codes which are electrically associated with one another on a database.

Each of the units 36 and 38 of FIG. 4 can be subjected to further processing wherein the units are split into smaller units, and ultimately formed into meat products which are packaged and distributed. Each of the smaller units preferably has a transponder assembly provided to be physically associated therewith, and each of codes from the transponder assemblies are preferably electrically associated with one another on a database.

The above-described methodology provides transponder devices physically associated with individual meat units formed from carcasses. Ultimately, such units will typically be packaged for subsequent commercial distribution. Preferably, the transponder devices are removed from the meat units prior to packaging the units. In particular embodiments of the invention, the transponder devices corresponding to meat units in a single package will be read with an interrogator, and the codes electrically linked with one another in a database, as well as being linked with an identification of the package. Accordingly, it will be possible for a user to access the database and determine which packages contained meat units of a particular carcass. Then, if a problem is discovered with any particular meat unit, all meat units obtained from the same carcass as the problem meat unit can be specifically tracked, even after the meat units have been packaged and distributed.

A method of reading the transponders associated with meat units in a particular package is to place all of the transponder devices removed from the meat units during packaging in a large tray and to interrogate the transponders utilizing so-called anti-collision methodology.

Figure 3:
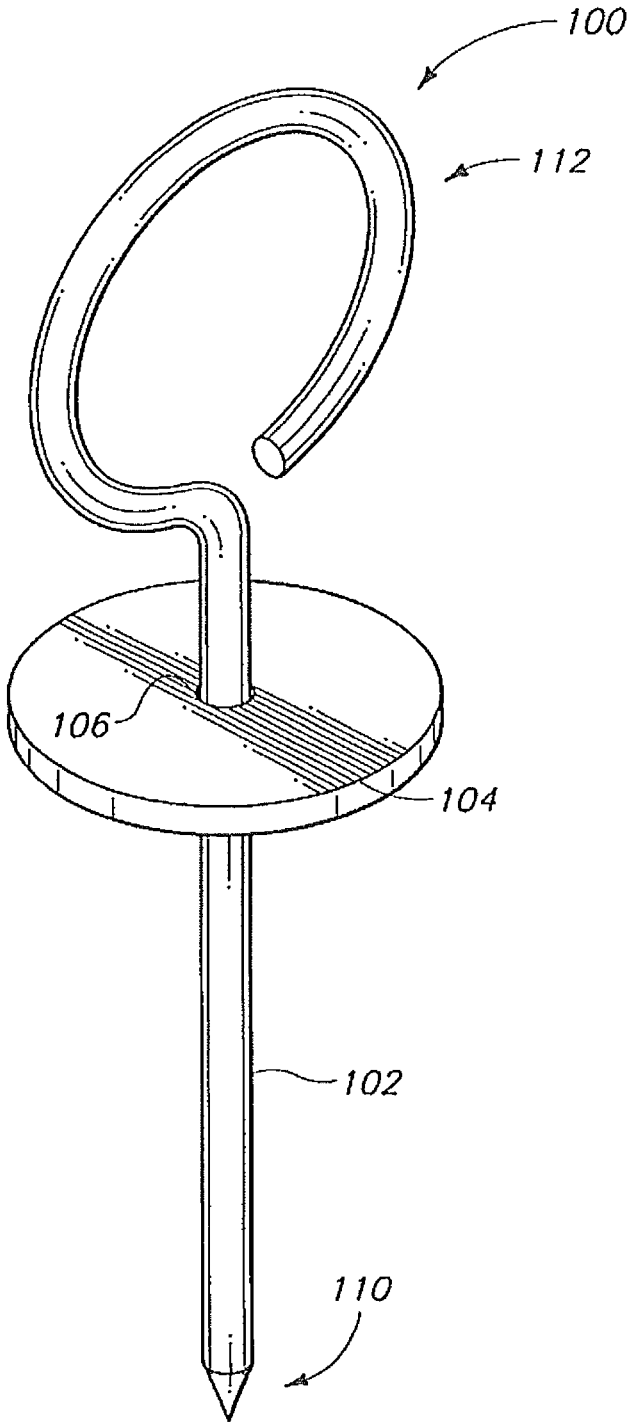
FIG. 3 is a perspective view of a meat spike assembly configured in accordance with an aspect of the present invention.
Figure 11E:
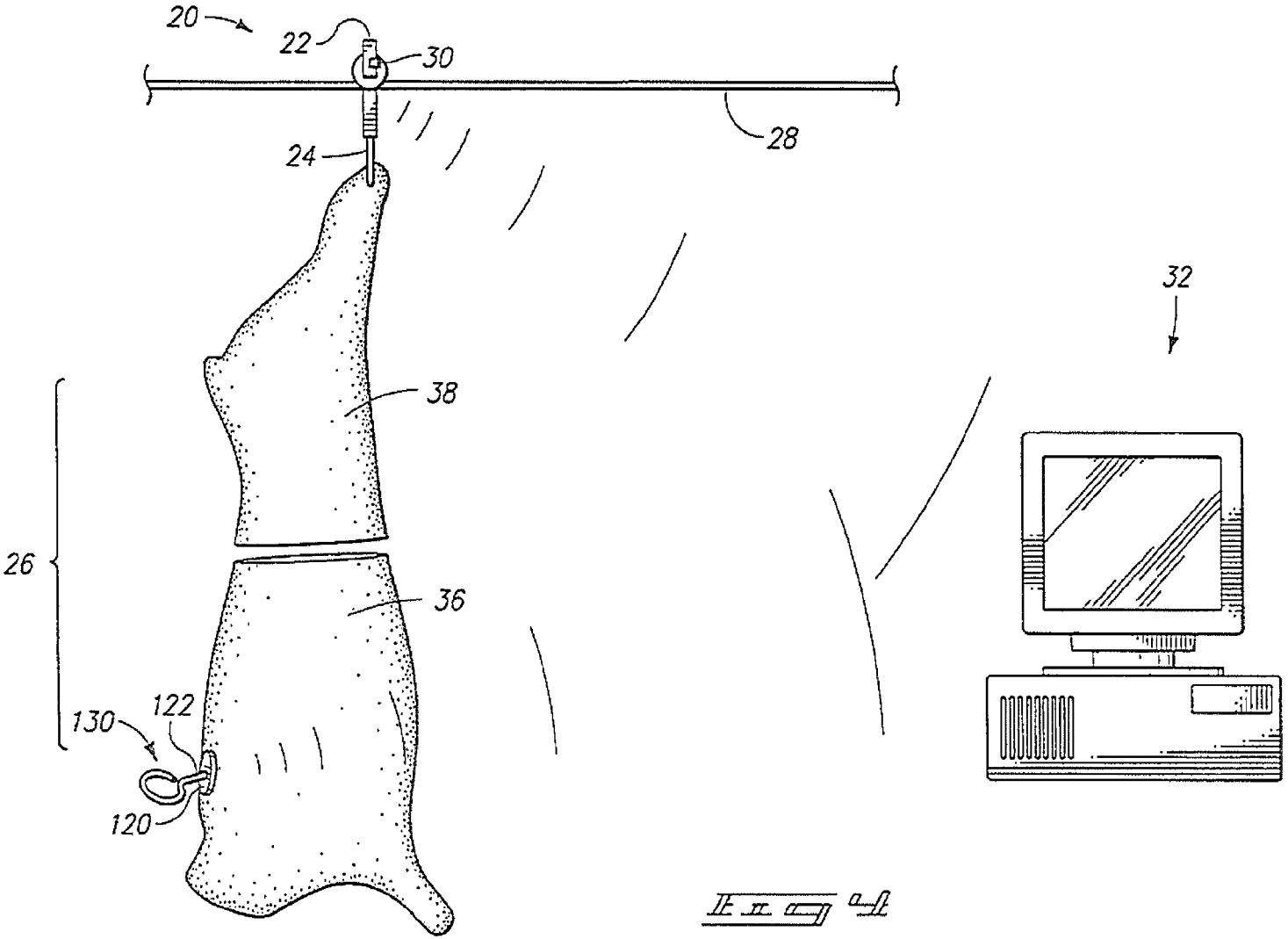

The meat spike assembly of FIG. 3 is but one embodiment of a meat spike assembly encompassed by the present invention. Another embodiment meat spike encompassed by the present invention is shown as an identification assembly 140 in FIG. 5. Assembly 140 comprises a housing 142 having a spike 144 extending therefrom. Housing 142 is configured to house a transponder device (not shown) therein and comprises a pair of planar surfaces 146 and 150 (only the edge of which is visible in the view of FIG. 5) joined by a sidewall 148. In the shown embodiment, surfaces 146 and 150 comprise a circular outer periphery, and sidewall 148 extends around such outer periphery. Sidewall 148 can extend entirely around the outer periphery, or only partially around the periphery.

Spike 144 extends from surface 150. In a preferred embodiment, spike 144 and housing 142 both comprise plastic. Plastic is preferred over, for example, metal, in that plastic will not substantially interfere with radio frequency signals passed from a transponder in housing 142 to an interrogator outside of housing 142. In particular embodiments, housing 142 and spike 144 can consist essentially of plastic. Further, housing 142 and spike 144 can be comprised by a single piece of plastic. Spike 144 preferably extends to from about 1 inch to about 2 inches from housing 142, and can extend to, for example, about 1.5 inches from housing 142.

Spike 144 terminates in a bulbous end 152. Such bulbous end can assist in retaining assembly 140 within a piece of meat. Specifically, once spike 144 is inserted into the meat, bulbous end 152 can increase a force required to remove assembly 140 relative to, for example, the force required to remove a spike that terminated in a tapered end (shown in FIG. 7). It is noted that other configurations of end 152 can be constructed, such as, for example, a barbed end. However, a barbed end is generally not preferred, as the barbs may damage meat upon removal of the barbed spike from the meat.

Figure 5:
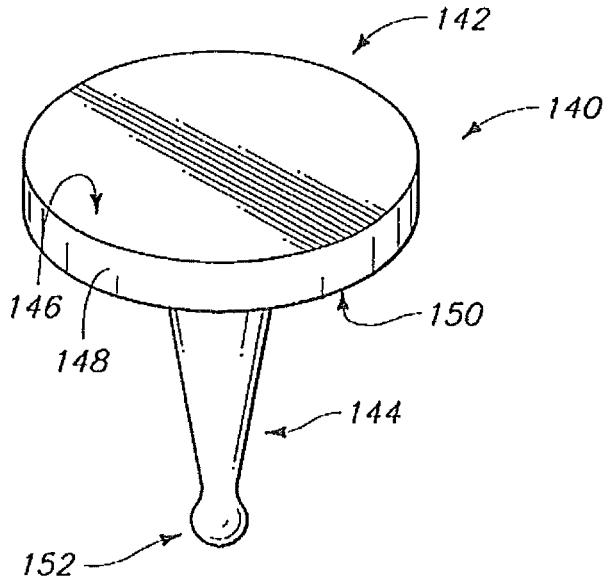
FIG. 5 is a perspective view of a second embodiment meat spike assembly configured in accordance with an aspect of the present invention.
Figure 6:
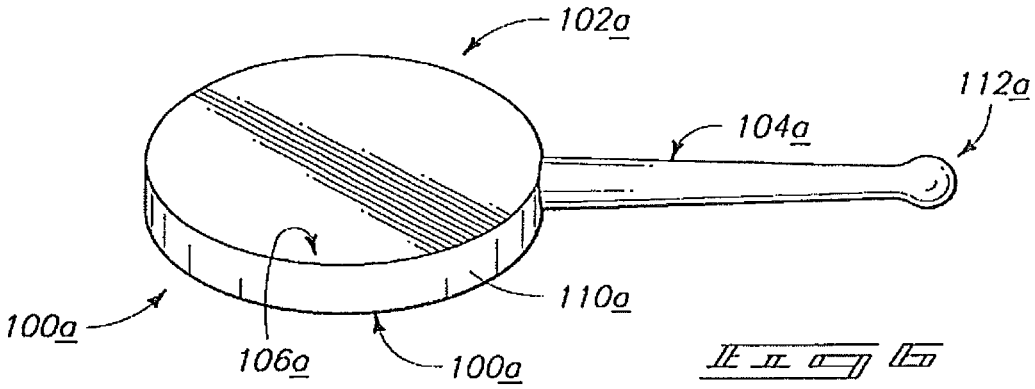
FIG. 6 is a perspective view of a third embodiment meat spike assembly configured in accordance with an aspect of the present invention.

Another configuration of a meat spike assembly is shown in FIG. 6. In referring to FIG. 6, similar numbering will be used as was utilized above in describing the embodiment of FIG. 5, with the suffix "a" utilized to indicate structures shown in FIG. 6. FIG. 6 illustrates a spike assembly 100a comprising a housing 102a and a spike 104a extending from the housing. Housing 102a can be constructed similarly to the housing 142 of FIG. 5, and spike 104a can be constructed similarly to the spike 144 of FIG. 5. A difference between the assembly 100a of FIG. 6 and the assembly 140 of FIG. 5 is that the spike 104a of assembly 100a extends from a sidewall of housing 102a, rather than from a planar surface.

It is noted that although only one spike is shown extending from transponder housings in the shown embodiments of FIGS. 5 and 6, the invention encompasses other embodiments (not shown) wherein multiple spikes extend from it single housing unit. It is further noted that the spike assemblies of FIGS. 5 and 6 can be utilized for identification of other materials and components besides meat.

Figure 7:
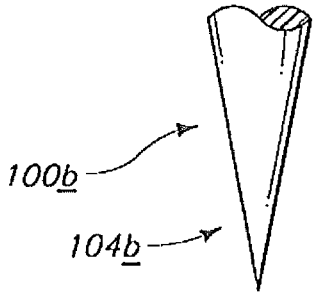
FIG. 7 is a perspective view of a fragmentary portion of a meat spike assembly configured in accordance with yet another aspect of the present invention.

Although the spikes shown in FIGS. 5 and 6 terminate in bulbous ends, the invention encompasses other embodiments wherein spikes terminate in other shapes of ends. An exemplary non-bulbous end of a spike is shown in FIG. 7 (wherein similar numbering is utilized as is utilized in describing the embodiments of FIGS. 5 and 6, with the suffix "b" utilized to indicate the structure shown in FIG. 7). FIG. 7 illustrates an assembly 100b comprising a spike 104b having a tapered end.

It is noted that although the invention is described herein with reference to methodologies of forming meat, the invention can have application to other processes wherein it is desirable to track units originating from a common source. For instance, in some applications units are distributed as batches. Frequently, the batches will arrive in a large container (the common source) and will subsequently be subdivided into smaller units which are separately redistributed (for instance, electronic devices, such as, for example, stereos and televisions, can be distributed in crates comprising a plurality of separate devices). If a problem is found in a redistributed unit, it may be desirable to locate all of the units which originated from the same batch to specifically recall such units.

Figure 8B:
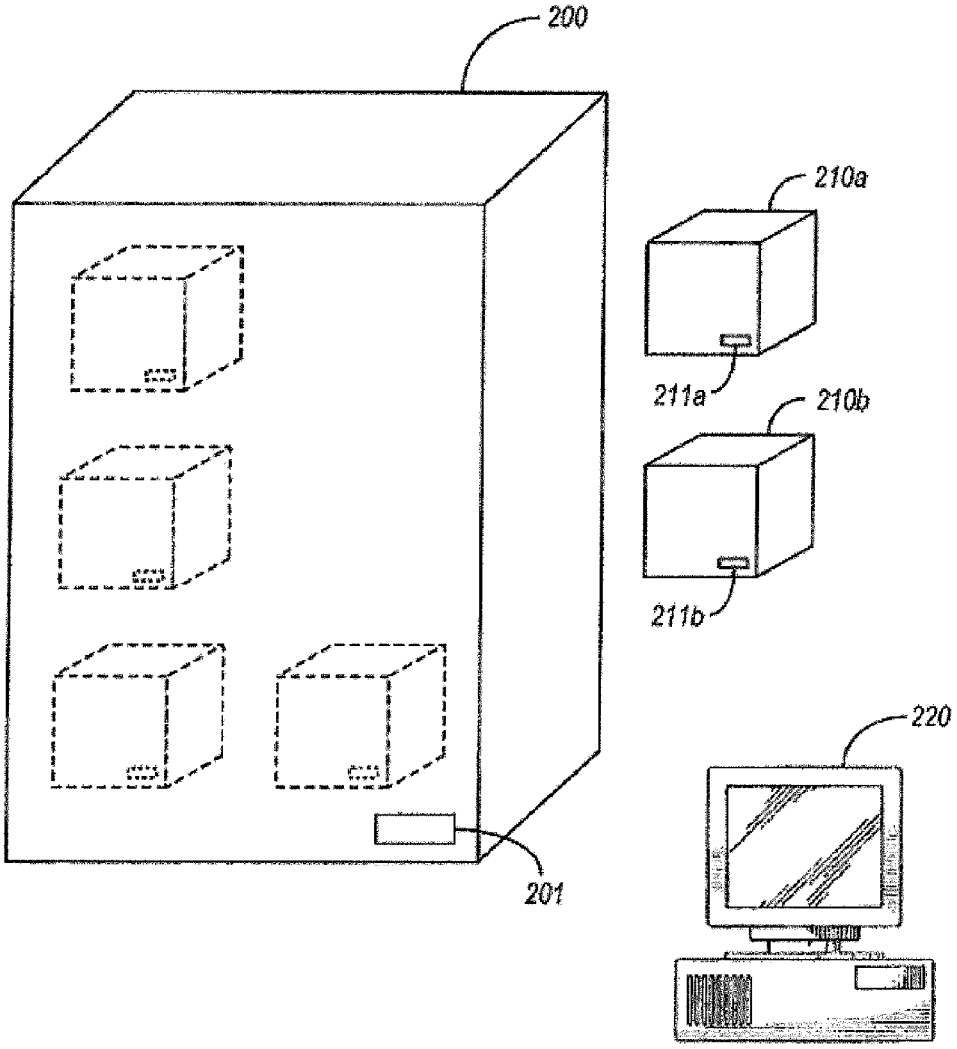
*FIG. 8 shows a view of a common source and associated units in accordance with one aspect of the present invention.*

In methodology of the present invention, a first transponder *201* can be physically associated with the common source *200*, and additional transponder devices *211 a-b* associated with units *210 a-b* as they are split from the common source *as shown in FIG. 8*. The codes of the transponder assemblies corresponding to units split from the common source will preferably be associated with the code of the first transponder unit in a database *220*. When the units are redistributed, the transponders may or may not be removed from the units. If the transponders are removed from the units, preferably the transponder codes are electrically associated with an identification of the individual units prior to distribution. In any event, each of the units split from the common source will preferably have a transponder code associated therewith and a user will preferably be able to utilize the database to track all of the units split from the common source once the user identifies either a package into which any of the units from the common source was provided for distribution, or it transponder code associated with any of the units split from the common source.

As is apparent from the discussion above, for purposes of the present invention a common source can be a plurality of separated units in a single container or an animal carcass, and in either event considered as comprising a plurality of units physically joined together (the meat carcass can be considered a union of individual meat units).

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

[1. A method for electronic tracking of units originating from a common source, comprising:

physically associating a first transponder with it common source, the source comprising a plurality of units physically joined with one another, the first transponder sending a code which is electrically associated with the common source;

splitting the common source to separate the source into two or more of the units;

physically associating a second transponder with one of the two or more units, the second transponder sending a code; and electrically associating the code of the second transponder with an identifier of the common some in a database.]

[2. The method of claim 1 wherein the first transponder is associated with the common source for a period of time during which the second transponder is not physically associated with the common source.]

[3. The method of claim 2 wherein the second transponder is not associated with any portion of the common source until after the splitting of the common source into two or more units.]

[4. The method of claim 1 wherein the first and second transponders comprise radio frequency identification devices, and wherein the sending a code comprises stimulating the radio frequency identification devices with an interrogator and transmitting data from the stimulated devices to the interrogator.]

[5. The method of claim 1 wherein the physically associating the second transponder occurs after the splitting of the source into two or more units.]

[6. The method of claim 1 wherein the common source comprises at least a portion of an animal body, wherein the units are different cuts of moat comprised by the animal body, and wherein the splitting comprises cutting the animal body into said units.]

[7. A method for electronic identification of meat units originating from a common animal carcass, comprising:

physically associating a first transponder with an animal carcass, the first transponder sending a code which is electrically associated with an identifier of the animal carcass;

splitting the animal carcass into two or more units and physically associating a second transponder with one of the two or more units, the second transponder being joined to a meat spike, the physically associating the second transponder with said one of the units comprising inserting the meat spike into said one of the units, the second transponder sending a code; and electrically associating the code of the second transponder with the identifier of the animal carcass.]

[8. The method of claim 7 wherein the first transponder is joined to a meat spike, and wherein the physically associating the first transponder with said carcass comprises inserting the meat spike into said carcass.]

[9. The method of claim 7 wherein the carcass is hung from a hanger on a trolley, and wherein the physically associating the first transponder with said carcass comprises joining the first transponder to the hanger.]

[10. A method for electronic identification of meat units originating from a common animal carcass, comprising:

providing an animal carcass on a conveyer and conveying the carcass through a meat processing plant, the animal carcass being no more than half of an animal body and initially having a first transponder physically associated therewith, the first transponder sending a code which is electrically associated with an identifier of the animal carcass;

first splitting the animal carcass into at least two first units, one or more of the first units being physically separated from the first transponder after the first splitting;

physically associating one or more second transponders with at least one of the first units which are physically separated from the first transponder after the first splitting, the second transponders sending codes; and electrically associating the codes of the second transponders with the identifier of the animal carcass.]

[11. The method of claim 10 wherein the first and second transponders comprise radio frequency identification devices, and wherein the sending a code comprises stimulating the radio frequency identification devices with an interrogator and transmitting data from the stimulated devices to the interrogator.]

[12. The method of claim 10 wherein the first transponder is joined to a meat spike, and wherein the physically associating the first transponder with said carcass comprises inserting the meat spike into said carcass.]

[13. The method of claim 10 wherein the second transponders are joined to meat spikes, and wherein the physically associating the second transponders with said at least one of the first units comprises inserting the meat spikes into said at least one of the first units.]

[14. The method of claim 10 wherein the carcass is hung from a hanger on a trolley, and wherein the physically associating the first transponder with said carcass comprises joining the first transponder to the hanger.]

[15. The method of claim 10 further comprising:

second splitting at least one of the first units into at least two second units, one or more of the second units being physically separated from both the first and second transponders after the second splitting;

physically associating one or more third transponders with at least one of the second units which are physically separated from the first and second transponders after the second splitting, the third transponders sending codes; and electrically associating the codes of the third transponders with the identifier of the animal carcass.]

[16. The method of claim 15 further comprising:

packaging a collection of units comprising one or more packaged units selected from the group consisting of first units, second units and mixtures thereof;

removing transponders from the units or the collection before the packaging;

providing a package identifier associated with the package in a database; and associating an identifier of the packaged units with the identifier of the animal carcass in the database, the identifier of the animal carcass being ascertained by interrogating the transponders physically associated with the units of the collection before the packaging.]

[17. A method for electronic identification of an originating animal carcass for packaged meat units, comprising:

providing a first animal carcass on a conveyer and conveying the first animal carcass through a meat processing plant, the first animal carcass initially having a first transponder physically associated therewith, the first transponder sending a code which is electrically associated with an identifier of the first animal carcass;

first splitting the first animal carcass into at least two first units, one or more of the first units being physically separated from the first transponder after the first splitting;

physically associating one or more second transponders with at least one of the first units which are physically separated from the first transponder after the first splitting, the second transponders sending codes;

electrically associating the codes of the second transponders with the identifier of the first animal carcass;

providing a second animal carcass on a conveyer and conveying the second animal carcass through the meat processing plant, the second animal carcass initially having a third transponder physically associated therewith, the third transponder sending a code which is electrically associated with an identifier of the second animal carcass;

second splitting the second animal carcass into at least two second units, one or more of the second units being physically separated from the third transponder after the second splitting;

physically associating one or more fourth transponders with at least one of the second units which are physically separated from the third transponder after the second splitting, the fourth transponders sending codes;

electrically associating the codes of the fourth transponders with the identifier of the second animal carcass;

packaging a collection of units comprising one or more packaged units selected from the group consisting of first units, second units and mixtures thereof;

removing transponders from the units of the collection before the packaging;

providing a package identifier associated with the package in a database; and electrically associating an identifier of the packaged units with the identifiers of the first and second animal carcasses in the database, the identifiers of the first and animal carcasses being ascertained by interrogating the transponders physically associated with the units of the collection before the packaging.]

[18. The method of claim 17 wherein the first, second, third and fourth transponders comprise radio frequency identification devices, and wherein the sending of codes from the first, second third and fourth transponders comprises stimulating the radio frequency identification devices with one or more interrogators and transmitting data from the stimulated devices to the interrogators.]

[19. The method of claim 17 wherein the first, second, third and fourth transponders comprise radio frequency identification devices, and wherein the ascertaining of the interrogating the transponders stimulating the transponders removed from the units of the collection before the packaging with an interrogator and transmitting data from the stimulated transponders to the interrogator.]

[20. The method of claim 17 wherein the second and fourth transponders are joined to meat spikes, and wherein the physically associating the second fourth transponders with said first and second units comprises inserting the meat spikes into the first and second units.]

[21. An identification assembly comprising:

a housing having an outer periphery;

a transponder entirely contained within the housing; and at least one spike removably secured to the housing.]

[22. The assembly of claim 21 wherein the housing and spike comprise plastic.]

[23. The assembly of claim 21 wherein the housing has only one spike extending therefrom.]

[24. The assembly of claim 21 wherein the housing and spike consist essentially of plastic.]

[25. The assembly of claim 21 wherein the housing comprises a pair of planar surfaces joined by a sidewall, and wherein the at least one spike extends from one of the surfaces.]

[26. The assembly of claim 25 wherein the planar surfaces comprise circular outer peripheries, and wherein the sidewall extends around the circular outer peripheries.]

[27. The assembly of claim 21 wherein the housing comprises a pair of planar surfaces joined by a sidewall, and wherein the at least one spike is spaced from the sidewall.]

[28. The assembly of claim 27 wherein the planar surfaces comprise circular outer peripheries, and wherein the sidewall extends around the circular outer peripheries.]

[29. A meat identification assembly comprising a transponder removably attached to a meat spike.]

[30. The assembly of claim 29 wherein:

the meat spike comprises:

a rod having a pair of opposing ends;

a point at one of the opposing ends of the rod; and a holder at an other of the opposing ends of the rod; and the transponder is attached to a substrate configured to slide over the rod and be retained by the holder.]

[31. The assembly of claim 29 wherein:

the meat spike comprises:

a rod having a pair of opposing ends;

a point at one of the opposing ends of the rod; and a loop at an other of the opposing ends of the rod; and the transponder is attached to a substrate configured to be retained to the rod by the loop.]

[32. A meat identification assembly comprising a radio frequency identification device (RFID) attached to a meat spike, and wherein:

the meat spike comprises:

a rod having a pair of opposing ends;

a point at one or the opposing ends of the rod; and a holder at an other of the opposing ends of the rod; and the RFID is attached to a substrate configured to slide over the rod and be retained by the holder.]

[33. The assembly of claim 32 wherein the RFID is configured as a passive device.]

[34. The assembly of claim 32 wherein:

the holder comprises a loop at the other of the opposing ends of the rod; and the substrate is configured to be retained to the rod by the loop.]

[35. The method of claim 1 wherein the physically associating comprises physically associating the first transponder with a monolithic common source.]

[36. An identification assembly comprising a transponder housed in an assembly having at least one spike extending therefrom, and wherein the housing comprises a pair of planar surfaces joined by a sidewall, and wherein the at least one spike extends from the sidewall, and wherein the at least one spike is configured for insertion into an object while maintaining substantially the same shape after insertion as before insertion, and wherein the at least one spike alone secures the identification assembly to the object; and wherein the planar surfaces comprise circular outer peripheries, and wherein the sidewall extends around the circular outer peripheries.]

[37. The assembly of claim 36 wherein the at least one spike is rigid.]

[38. A meat identification assembly comprising a transponder attached to a meat spike, the meat spike comprising:

a rod having a pair of opposing ends;

a point at one of the opposing ends of the rod; and a holder at an other of the opposing ends of the rod; and the transponder is attached to a substrate configured to slide over the rod and be retained by the holder.]

[39. A meat identification assembly comprising a transponder attached to a meat spike, the meat spike comprising:

a rod having a pair of opposing ends;

a point at one of the opposing ends of the rod; and a loop at an other of the opposing ends of the rod; and the transponder is attached to a substrate configured to be retained to the rod by the loop.]

[40. A meat identification assembly comprising a radio frequency identification device (RFID) attached to a meat spike, the meat spike comprising:

a rod having a pair of opposing ends;

a point at one of the opposing ends of the rod; and a holder at an other of the opposing ends of the rod; and the RFID is attached to a substrate configured to slide over the rod and be retained by the holder.]

[41. A meat identification assembly comprising a radio frequency identification device (RFID) attached to a meat spike, the meat spike comprising:

a rod having a pair of opposing ends;

a point at one of the opposing ends of the rod; and a loop at an other of the opposing ends of the rod; and the RFID is attached to a substrate configured to be retained to the rod by the loop.]

[42. An identification assembly comprising a transponder housed in an assembly having at least one spike extending therefrom, and wherein the housing comprises a pair of planar surfaces joined by a sidewall, and wherein the at least one spike extends from the sidewall, and wherein the at least one spike is configured for insertion into an object while maintaining substantially the same shape after insertion as before insertion; and wherein the planar surfaces comprise circular outer peripheries, and wherein the sidewall extends around the circular outer peripheries.]

[43. A meat identification assembly comprising a transponder attached to a meat spike, the meat spike comprising:

a rod having a pair of opposing ends;

a point at one of the opposing ends of the rod; and a holder at an other of the opposing ends of the rod; and the transponder is attached to a substrate configured to slide over the rod and be retained by the holder.]

[44. A meat identification assembly comprising a transponder attached to a meat spike, the meat spike comprising:

a rod having a pair of opposing ends;

a point at one of the opposing ends of the rod; and a loop at an other of the opposing ends of the rod; and the transponder is attached to a substrate configured to be retained to the rod by the loop.]

[45. A meat identification assembly comprising a radio frequency identification device (RFID) attached to a meat spike, and wherein:

the meat spike comprises:

a rod having a pair of opposing ends;

a point at one of the opposing ends of the rod; and a loop at an other of the opposing ends of the rod; and the RFID is attached to a substrate configured to be retained to the rod by the loop.]

*46. A method for remotely sensing articles, comprising:*

*providing a source with at least one unit associated therewith, the source and at least one unit having a common identification;*

*providing a first radio frequency identification (RFID) device associated with the source comprising a substrate, the first RFID device comprising:*

*one or more antennas disposed adjacent the substrate;*

*a radio frequency transceiver integrated circuit disposed adjacent the substrate comprising a radio frequency receiver for receiving radio frequency signals, a radio frequency transmitter for communicating radio frequency signals, control logic, a memory for persistently storing data including the common identification indicating the source, the radio frequency transceiver integrated circuit coupled to the one or more antennas, and a power source coupled to the radio frequency transceiver integrated circuit;*

*using a remote radio frequency interrogator, transmitting a radio frequency signal including a command interrogating the first RFID device to determine the common identification;*

*receiving in response, a radio frequency signal communication from the first RFID device including the common identification;*

*affixing to at least one unit physically associated with the source a second RFID device comprising a substrate, a radio frequency transceiver integrated circuit disposed adjacent the substrate comprising a radio frequency receiver, a radio frequency transmitter, control logic, a memory for persistently storing data, the radio frequency transceiver integrated circuit coupled to the one or more antennas, and a power source coupled to the radio frequency transceiver;*

*transmitting to the second RFID device, from a radio frequency interrogator in remote proximity to the selected article a radio frequency signal including a second identification and a command to store the second identification in the memory within the second RFID device;*

*storing the second identification in the memory of the second RFID device; and*

*associating the common identification and the second identification in a database.*

*47. The method of claim 46 and further comprising:*

*subsequently transmitting radio frequency signals including an interrogation command to the second RFID device from a radio frequency interrogator in remote proximity to the unit;*

*receiving the second identification as part of a radio frequency signal response communicated from the second RFID device; and*

*determining the common identification from referring to the second identification in the database.*

*48. The method of claim 46, wherein and further comprising:*

*removing the unit to a location remote from the source;*

*transmitting from an interrogator in remote proximity to the selected article a radio frequency command message requesting that the second RFID device respond with an identification; and*

*receiving from the second RFID device a radio frequency signal that includes the second identification stored in the memory of the second RFID device.*

*49. The method of claim 48 and further comprising accessing the database and determining the common identification from the second identification.*

*50. The method of claim 46, wherein the providing the first RFID device further comprises providing the radio frequency transceiver integrated circuit device operable to receive spread spectrum modulated radio frequency signals.*

*51. The method of claim 46, wherein providing the RFID device further comprises providing the radio frequency transceiver integrated circuit device operable to receive spread spectrum modulated radio frequency signals modulated using one selected from the group of amplitude modulation, binary phase shift keying, and combination thereof.*

*52. The method of claim 46, wherein providing the RFID device comprises providing the radio frequency transceiver integrated circuit device operable to communicate spread spectrum modulated radio frequency signals using backscatter reflection.*

*53. The method of claim 46, wherein providing the RFID device further comprises providing the radio frequency transceiver integrated circuit with the power source that is a capacitively coupled power supply operable to provide power in the presence of radio frequency signals.*

*54. The method of claim 46, wherein providing the RFID device further comprises providing the radio frequency transceiver integrated circuit with the memory wherein the memory has a nonvolatile portion.*

*55. The method of claim 54, wherein providing the nonvolatile memory further comprises providing a memory that is readable and writeable.*

*56. The method of claim 54, wherein providing the memory further comprises providing a memory portion that is unalterable.*

*57. The method of claim 46, wherein providing the RFID device further comprises providing the radio frequency transceiver integrated circuit with memory that has a volatile portion.*

*58. The method of claim 46, wherein providing the RFID device further comprises providing the power source that is a thin film battery.*

*59. The method of claim 58, wherein providing the RFID device further comprises providing the radio frequency transceiver integrated operable to actively transmit spread spectrum modulated radio frequency signals.*

*60. The method of claim 46, wherein providing the RFID device further comprises providing the radio frequency transceiver integrated with the control logic being one selected from the group of a microprocessor, a microcontroller, and combinations thereof.*

*61. The method claim 46, wherein providing the source comprises providing perishable goods.*

*62. The method of claim 46, wherein providing the source comprises providing goods disposed in a container.*

*63. The method of claim 62, wherein the container has the first RFID device affixed to it.*

*64. The method of claim 46, wherein providing the source comprises providing goods disposed on a pallet.*

*65. The method of claim 64, wherein the pallet has the RFID device affixed to it.*

*66. The method of claim 47 and further comprising:*

*providing a source with a plurality of units, the source and the plurality of units having a common identification;*

*removing additional units from the source;*

*associating additional RFID devices with one or more of the additional units;*

*transmitting from a remote radio frequency signal interrogator to each additional RFID device a unique identifier for storage in the memory of the each additional RFID device; and*

*associating each of the unique identifiers with the common identifier in the database.*

*67. A method comprising:*

*providing a source and at least one unit from the source having a common identification., wherein the unit is packaged with the source;*

*providing, on the source, a first radio frequency identification (RFID) device associated with the group of articles comprising a substrate, the first RFID device further comprising:*

*one or more antennas disposed adjacent the substrate, a radio frequency transceiver integrated circuit disposed adjacent the substrate comprising a radio frequency receiver for receiving radio frequency signals, a radio frequency transmitter for communicating radio frequency signals, control logic, a memory for persistently storing data including the common identification indicating the group;*

*the radio frequency transceiver integrated circuit coupled to the one or more antennas, and a power source coupled to the radio frequency transceiver integrated circuit;*

*transmitting to the first RFID device, from a radio frequency interrogator in remote proximity to the group of article, a radio frequency signal including a command interrogating the first RFID device to determine the common identification;*

*receiving in response, a radio frequency signal communication from the first RFID device including the common identification;*

*affixing to a selected unit from the source a second RFID device comprising a substrate, a radio frequency transceiver integrated circuit disposed adjacent the substrate comprising a radio frequency, a radio frequency transmitter, control logic, a memory for storing data including a second identification, the radio frequency transceiver integrated circuited coupled to the one or more antennas, and a power source coupled to the radio frequency transceiver;*

*transmitting to the second RFID device, from a radio frequency interrogator in remote proximity to the selected article, a radio frequency signal including a command interrogating the second RFID device to determine the second identification;*

*receiving in response, a radio frequency signal communication from the second RFID device including the second identification;*

*associating the common identification and the second identification in a database; and*

*associating the common identification of the source and the second identification of the unit, with information about the source and the unit in the database.*

*68. The method of claim 67 and further comprising:*

*subsequently transmitting radio frequency signals including an interrogation command to the second RFID device from a radio frequency interrogator in remote proximity to the selected unit;*

*receiving the second identification as part of a radio frequency signal response communicated from the second RFID device; and*

*determining the common identification from referring to the second identification in the database.*

*69. The method of claim 67, wherein providing the first RFID device further comprises providing the radio frequency transceiver integrated circuit device operable to receive spread spectrum modulated radio frequency signals modulated using one selected from the group of amplitude modulation, binary phase shift keying, and combinations thereof.*

*70. The method of claim 67, wherein providing the first RFID device further comprises providing the radio frequency transceiver integrated circuit device operable to communicate spread spectrum modulated radio frequency signals using backscatter reflection.*

*71. The method of claim 67, wherein the source is a pallet, wherein the pallet has the first RFID device affixed to it.*

*72. The method of claim 68 and further comprising:*

*removing additional units from the source;*

*associating additional RFID devices with one or more of the additional units;*

*transmitting from a remote radio frequency signal interrogator to each additional RFID device a unique identifier for storage in the memory of the each additional RFID device; and*

*associating each of the unique identifiers with the common identifier in the database.*

*73. A method comprising:*

*receiving a source for at least one unit having a common identification, the source and unit are packaged together, wherein a first radio frequency identification (RFID) device is affixed to the source and is associated with the at least one unit, and at least a second RFID device is affixed to the at least one unit, wherein at least the first and second RFID comprise a substrate, one or more antennas disposed adjacent the substrate, a radio frequency transceiver integrated circuit disposed adjacent the substrate comprising a radio frequency receiver for receiving radio frequency signals, a radio frequency transmitter for communicating radio frequency signals, control logic, a memory for storing identification data, the radio frequency transceiver integrated circuit*

*coupled to the one or more antennas, and a power source coupled to the radio frequency transceiver integrated circuit;*

*transmitting to the first RFID device from a radio frequency interrogator in remote proximity to the source and at least one unit, a radio frequency signal including a command interrogating the first RFID device to determine the common identification;*

*receiving in response, a radio frequency signal communication from the first RFID device including the common identification;*

*accessing a database wherein the common identification is associated with at least the second identification in the database;*

*transmitting to at least the second RFID device affixed to the at least one unit from the source, from a radio frequency interrogator in remote proximity to the selected article, a radio frequency signal including a command interrogating the second RFID device to determine the second identification;*

*receiving in response, a radio frequency signal communication from the second RFID device including the second identification;*

*accessing the database wherein at least the second identification of the at least one unit from the source is associated with information about the source; and*

*separating the at least one unit from the source and redistributing the at least one unit.*

*74. The method of claim 73, wherein the radio frequency transceiver integrated circuit device of the first and second RFID device, is operable to receive spread spectrum modulated radio frequency signals modulated using one selected from the group of amplitude modulation, binary phase shift keying, and combinations thereof.*

*75. The method of claim 73, wherein the radio frequency transceiver integrated circuit device of the first and second RFID device, is operable to communicate spread spectrum modulated radio frequency signals using backscatter reflection.*

*76. The method of claim 73, wherein the source is a pallet and the at least one unit is a package disposed on the pallet, wherein the pallet has the first RFID device affixed to it.*

*77. The method of claim 73 and further comprising:*

*removing additional units from the source, wherein each unit has affixed thereto an RFID device;*

*transmitting to RFID devices affixed to the additional units from the source, from a radio frequency interrogator in remote proximity to the additional articles, a radio frequency signal including a command interrogating the additional RFID devices to determine their respective identifications;*

*receiving in response, a radio frequency signal communication from one or more of the additional RFID devices including their respective identifications; and*

*accessing the database wherein at least the respective identifications of the additional units from the source are associated with information about the units.*

* * * * *